UNITED STATES PATENT OFFICE.

EDMUND BASIL WEDMORE, OF HENDON, ENGLAND, ASSIGNOR TO GENERAL ELECTRIC COMPANY, A CORPORATION OF NEW YORK.

PROTECTIVE DEVICE.

1,341,488.   Specification of Letters Patent.   Patented May 25, 1920.

Application filed October 24, 1919. Serial No. 333,012.

*To all whom it may concern:*

Be it known that I, EDMUND B. WEDMORE, a subject of the King of Great Britain, residing at Hendon, England, have invented certain new and useful Improvements in Protective Devices, of which the following is a specification.

My invention relates to protective devices for electric feeders particularly to protective systems of the pilot wire type and has for its object to overcome the difficulties experienced in applying such protective systems to feeders or plants of large magnitude owing to the necessity of accurately balancing the protecting transformers and of dealing with the capacity current in the pilot wires connecting the transformers.

It has hitherto been proposed in such systems to overcome the effect of the capacity current in the pilot wire circuit by applying a compensating electromotive force to the circuit or a compensating magnetomotive force to the trip coils or relay coils of the tripping circuit of the circuit breakers. It has further been proposed to overcome the capacity of the pilot wire circuit by means of an auxiliary compensating conductor or shield which is open-circuited and connected across the secondaries of the protective current transformers so that the capacity current does not affect the protective relays. Neither of these arrangements are effective inasmuch as they do not compensate for the lack of balance which may exist between the protective transformers when large currents flow in the system. According to my invention I provide on the relays or trip coils of the protective system restraining or biasing coils excited by current dependent upon the feeder current. The current may be supplied from the current transformers of the protective system, and the biasing or restraining coils may be used alone, in combination with ordinary relays or they may be used in combination with the compensating coils hereinbefore referred to. They may also be fitted to the relays used with the shielded or compensated pilot wire circuit above mentioned and the said relays may also be fitted with compensating coils.

Figure 1:
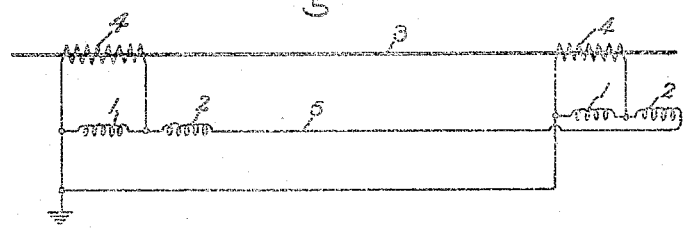
Figure 2:
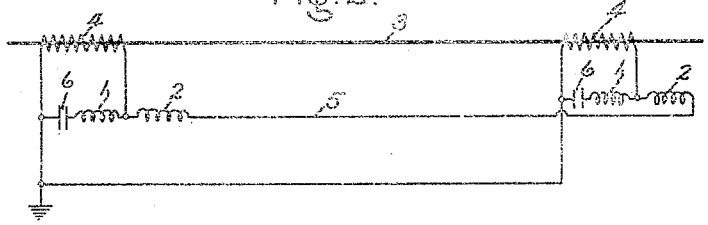

Figures 1, 2, 3 and 4 of the accompanying drawings diagrammatically illustrate a protective system embodying various forms of my invention. In the application of the invention illustrated in Fig. 1, I provide a circuit controlling device, which, by way of example is shown as a relay comprising an operating coil opposed in its action by a restraining coil. These coils may be connected to opposite ends of a balanced arm or may be connected in any other way well known in the art to produce a resultant or differential action. The restraining coil 1 is connected at each end of the feeder in parallel with a protective transformer 4 and in series with the operating coil 2 and pilot wire 5 of the protective system. Such a relay embodying coils 1 and 2 may be arranged in a great many forms but it is only essential that the effect of coil 1 is to restrain the effect of coil 2. With such an arrangement assuming that no compensation is provided for the capacity of the pilot wire circuit, the restraining effect on the relay would diminish with increasing frequency, while the capacity current would increase therewith. By suitably adjusting the constants of the circuit of the restraining and operating coils of the relays, an improvement may be obtained which in some cases may be all that may be desired, as for example, in the application of my invention to existing systems, by connecting a device 6 having a condenser action and of suitable capacity, in series with the restraining coil 1 as shown in Fig. 2. With such an arrangement no serious loss of restraining power would result from increase of frequency.

Figure 3:
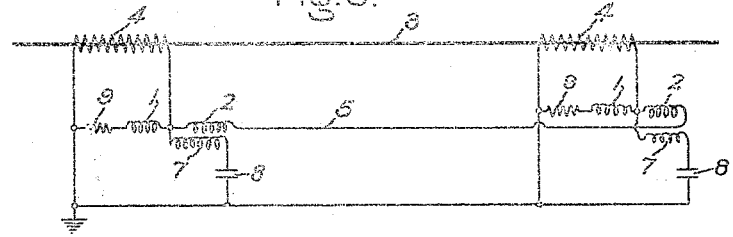

If a restraining coil is provided on its relay as illustrated in Fig. 3 fitted, as has hitherto been proposed, with a compensating winding 7, in series with a condenser 8 to overcome the effect of capacity in the pilot wire circuit, improved results may be obtained and the effect of the restraining coil may be adjusted simply by resistance 9 in series with the latter. A condenser may also take the place of the resistance 9.

Figure 4:
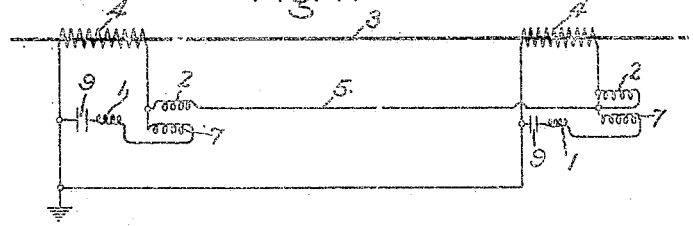

As an alternative to the last mentioned arrangement which dispenses with the separate condenser in series with the compensating coil on the relay, the restraining and compensating coils of the relay may be connected in series with the pilot wire circuit and with a condenser device as illustrated in Fig. 4. In this case the relay has an operating coil 2 and compensating winding 7 both of which normally carry capacity currents but one of which carries energy current on the occurrence of a fault. The capacity currents normally neutralize each other but the energy current operates the relay as an excess current device. In addition the relay is normally restrained from operating by the current in the restraining winding 1 thus compensating for normal unbalancing due to lack of balance in the protective transformers or to defective capacity compensation of the pilot wire circuit.

What I claim as new and desire to secure by Letters Patent of the United States, is:—

1. In a protective system for an electric feeder, the combination with a transformer connected at each end of said feeder, of a pilot wire or wires connecting the secondaries of said transformers in an electric circuit, and control devices at each end of said feeder comprising an operating coil in series with each transformer secondary, a restraining coil in an independent circuit in shunt to each secondary, and means having a condenser action in series with said restraining coil.

2. In a protective system for an electric feeder, the combination with a transformer connected at each end of said feeder, of a pilot wire or wires connecting the secondaries of said transformers in an electric circuit, and control devices at each end of said feeder comprising an operating coil in series with each transformer secondary, and means for compensating for the effect of capacity current in said pilot wire circuit including a restraining coil in an independent shunt circuit to each secondary and a device having a condenser action in series with said restraining coil.

3. In a protective system for an electric feeder, the combination with a transformer connected at each end of said feeder, of a pilot wire or wires connecting the secondaries of said transformers in an electric circuit, and control devices at each end of said feeder comprising an operating coil in series with each transformer secondary, and compensating means for overcoming the capacity effect of said pilot wire, including a restraining coil in an independent shunt circuit to each secondary opposing the effect of said operating coil, and means for changing the effect of said restraining coil connected in series therewith.

4. In a protective system for an electric feeder, the combination with a transformer connected at each end of said feeder, of a pilot wire or wires connecting the secondaries of said transformers in a series circuit, and control devices at each end of said feeder comprising an operating coil in series with each transformer secondary, and compensating means for overcoming the capacity effect of said pilot wire including a restraining coil in a separate circuit in shunt to each secondary and opposing the action of said operating coil, and means for changing the effect of said restraining coil including a resistance in series therewith.

5. In a protective system for an electric feeder, the combination with a transformer connected at each end of said feeder, of a pilot wire or wires connecting the secondaries of said transformers in an electric circuit, and control devices at each end of said feeder comprising an operating coil, a restraining coil opposing the action of said operating coil, a compensating coil in shunt to each transformer secondary, and a condenser in series with said compensating coil.

6. In a protective system for an electric feeder, the combination with a transformer connected at each end of said feeder, of a pilot wire or wires connecting the secondaries of said transformers in a series circuit and control devices at each end of said feeder comprising an operating coil, a restraining coil, and means in series with said restraining coil to compensate for the capacity effect in said pilot wire current due to change of frequency.

In witness whereof I have hereunto set my hand this 29' day of Sept., 1919.

EDMUND BASIL WEDMORE.